United States Patent [19]

Stratton

[11] 4,152,740
[45] May 1, 1979

[54] MAGNETIC DISC RECORDER AND CASSETTE

[75] Inventor: Boyd L. Stratton, Woodside, Calif.

[73] Assignee: Arvin Industries, Inc., Columbus, Ind.

[21] Appl. No.: 851,055

[22] Filed: Nov. 14, 1977

Related U.S. Application Data

[63] Continuation-in-part of Ser. No. 777,882, Mar. 16, 1977, abandoned.

[51] Int. Cl.² .................... G11B 5/016; G11B 5/82; G11B 23/02
[52] U.S. Cl. ................................. 360/99; 360/133
[58] Field of Search ................ 360/99, 86, 97–98, 360/132–133, 135; 206/444; 346/137

[56] References Cited

U.S. PATENT DOCUMENTS

| | | | |
|---|---|---|---|
| 3,833,926 | 9/1974 | Hall | 360/135 |
| 3,845,502 | 10/1974 | Paus | 360/86 |
| 3,947,893 | 5/1974 | Hall, Sr. | 360/133 |
| 4,060,839 | 11/1977 | Meadows | 360/99 |
| 4,063,295 | 12/1977 | Mann et al. | 360/99 |

*Primary Examiner*—Alfred H. Eddleman
*Attorney, Agent, or Firm*—Biebel, French & Nauman

[57] ABSTRACT

A magnetic recorder of the flexible disc type has an improved recording device comprising a pair of thin flexible recording discs having oppositely facing magnetizable surfaces and a flexible backing disc between the recording discs extending behind essentially their entire surface. A hub connects all three of said discs and forms the sole connection therebetween. The hub includes a central aperture and a drive aperture outwardly of the central aperture, the drive aperture including a surface extending along a chord of the hub to provide with the central aperture a unique two point attachment defining the center of rotation of the discs. A cassette surrounds the discs, protecting and supporting them, and including top and bottom walls spaced apart sufficiently to avoid substantial contact with the recording discs when the hub is rotated at recording speed. The top and bottom walls having openings sufficiently larger than and aligned with the hub to afford drive access to the hub and to allow the hub and discs to comply to a center of rotation established by the structure of the hub. The top and bottom walls having elongated transducer access ports extending on a radius of the discs and aligned with each other whereby air flowing outwardly in the cassette during rotation of the discs will tend to exit equally at both the top and bottom of the cassette to minimize disturbance of the plane assumed by the rotating discs.

3 Claims, 14 Drawing Figures

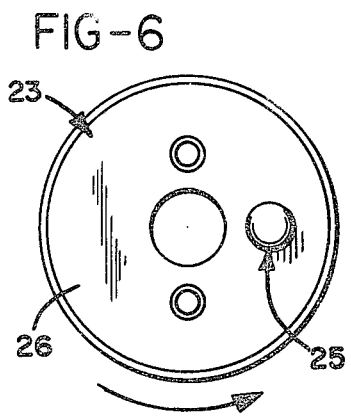
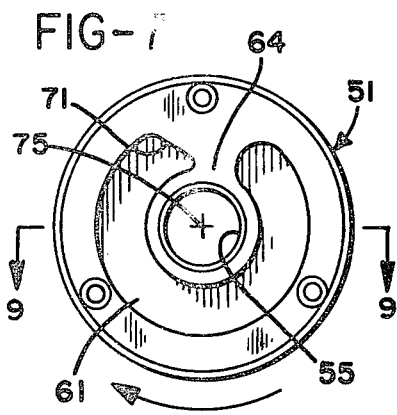
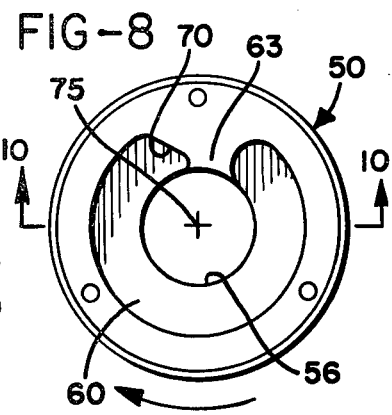
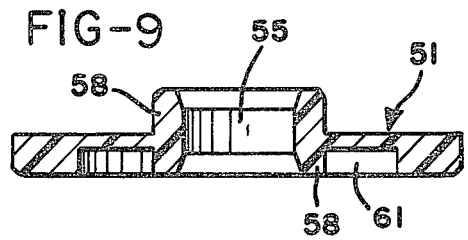
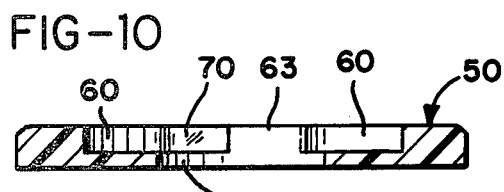
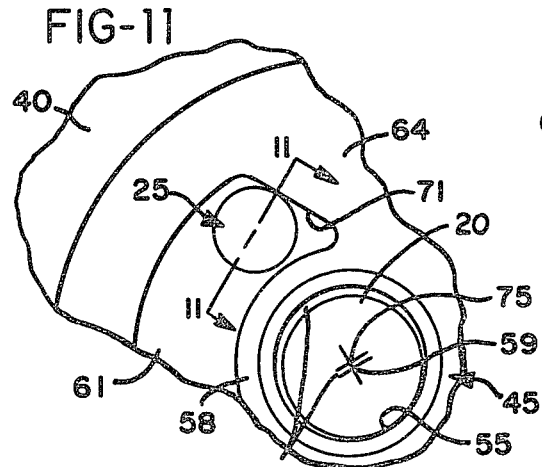
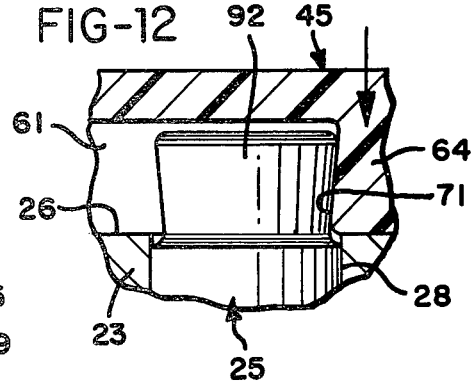
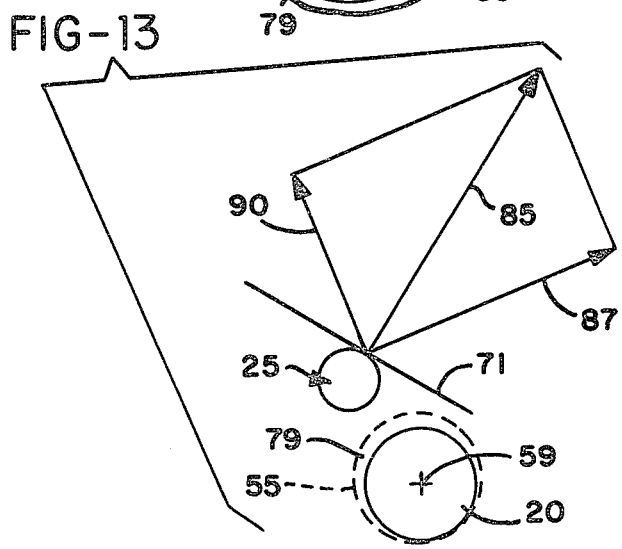
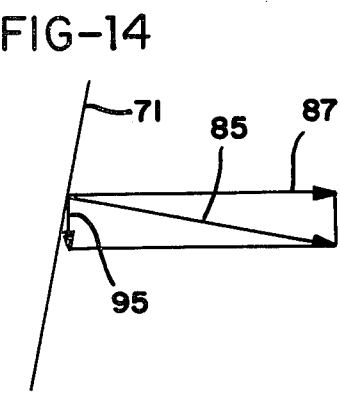

MAGNETIC DISC RECORDER AND CASSETTE

CROSS-REFERENCE TO RELATED APPLICATION

This application is a continuation-in-part of application Ser. No. 777,882, filed Mar. 16, 1977, for MAGNETIC DISC RECORDER AND CASSETTE, and now abandoned.

BACKGROUND OF THE INVENTION

This application relates to flexible magnetic disc recorders, and particularly to flexible recording discs housed in a protective cassette, such as generally disclosed in U.S. Pat. Nos. 3,833,926 and 3,947,893. Such discs have been used, for example, to record and play back individual frames of video information (two interlaced fields). In accordance with U.S. standards a single field can be stored on a circular track with the disc rotating at 30 revolutions per second (1800 rpm). The speed varies somewhat with standards in other countries, but the principles are basically the same.

For various reasons it may be desirable to rotate the recording disc much faster. One case is in a single field recording, where the rpm of the disc must be doubled, to 3600 rpm in the U.S. Even the 30 rpm speeds are considerably faster than those normally encountered in digital recording, such as used in data processing. As the rotational speed of the thin flexible discs increases the dynamics of the disc become more important. At speeds in the order of 3000 rpm and above considerable centrifugal force is exerted on the hub and the central area of the disc. Also, when the disc is rotated within a confined region, as in a cassette there is much more significant tendency to pump air outward along the disc surfaces. Any unbalance in air pressure on either side of the disc can result in forces which tend to deflect the disc from the plane which it seeks due to centrifugal force.

Coupled with these factors is the desirability of having recording disc units which are interchangeable in the recorder. The vertical interval (retrace) information indicates the beginning and/or end of each field of video information. It is desirable to have such information generally aligned track for track, e.g., radially of the disc. This in turn requires that the disc always achieve the same relative position to the drive hub, from which the discs are to be removed and interchanged.

SUMMARY OF THE INVENTION

The present invention provides a novel flexible magnetic disc recording unit in which the disc device is rotated a relatively high speeds, for example in the order of 3000 rpm. The disc construction includes a flexible base or backing disc having closely packed independent fibers extending generally normal to the disc surface (or surfaces in the case of a two sided recording). These provide a compliant support for a thin flexible disc of recording material, having a magnetic recording surface, which is attached to the backing disc only at the hub.

The hub structure is of a type which engages with a drive hub always at the same point, and in such a way that the two parts are urged to interlock under dynamic (driving) conditions.

The surrounding cassette structure includes access slots aligned on a radius of the disc assembly. There are slots on both sides of the disc, matched back to back, regardless of whether the recording surface is on one or both sides of the disc assembly, and the slots are co-extensive. This allows air pumped outwardly to escape just about equally on each side of the disc assembly, and the tendency to deflect the portion of the disc assembly passing the slot is essentially equalized.

The primary object of the invention, therefore, is to provide a magnetic record disc of the type having a flexible backing disc member with a compliant surface supporting a thin flexible recording disc member with a magnetizable coating, surrounded by a protective cassette having walls closely spaced from the disc assembly, and having access slots in said walls which are aligned and essentially co-extensive to allow air pumped outwardly to escape equally away from both sides of the disc assembly; and to provide such a cassette enclosed recording disc in which a unique single point contact driven hub is incorporated.

Other objects and advantages and advantages of the invention will be apparent from the following description, the accompanying drawings and the appended claims.

BRIEF DESCRIPTION OF THE DRAWINGS

FIG. 6 is a top view of the disc driver;

FIGS. 7 and 8 are bottom and top views, respectively, of parts of the driven hub;

FIG. 9 is a cross-sectional view taken on line 9—9 of FIG. 7;

FIG. 10 is a cross-sectional view taken on line 10—10 of FIG. 8;

FIG. 11 is an enlarged, fragmentary bottom view of the driven hub seated upon the driver, showing the driver pin engaging a surface within the drive aperture to draw the driven hub sideways against the spindle;

FIG. 12 is a vector diagram showing components of the thrust vector generated in the plane of FIG. 11;

FIG 13 is a cross-sectional view taken on line 13—13 of FIG. 11 and showing the driver pin engaging the driven surface, tending to draw the driven hub down against the driver; and FIG. 14 is a vector diagram showing the components of the thrust vector generated in the plane of FIG. 13.

DESCRIPTION OF THE PREFERRED EMBODIMENT

Figure 1:
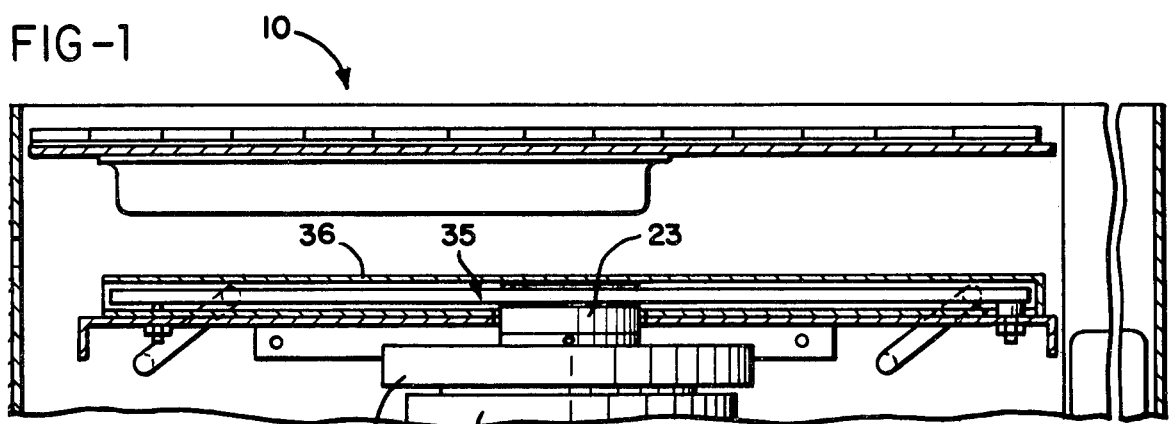
FIG. 1 is a cross-sectional view of a portion of a magnetic disc recorder embodying the present invention.
Figure 3:
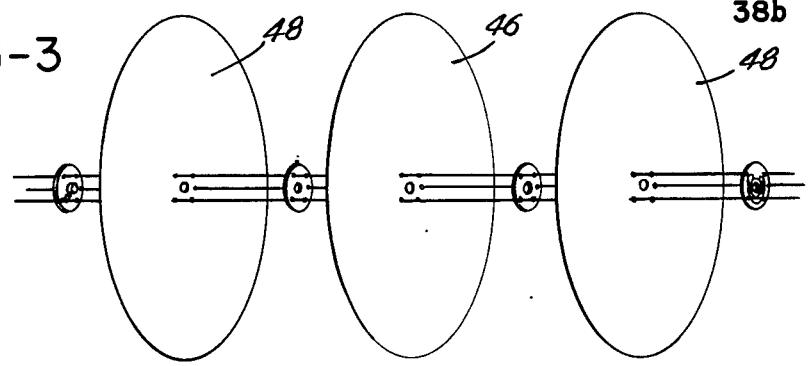
FIG. 3 is an exploded perspective view of portions of the recording disc subassembly.

FIG. 1 is a partial cross sectional view of portions of a magnetic disc recorder 10 such as more fully described in U.S. Pat. Nos. 3,833,926 of Sept. 3, 1974, and 3,845,502 of Oct. 29, 1974, both assigned to the assignee of the present invention. Recorder 10 includes a flywheel 12 and a tachometer 14 attached to a drive shaft 15 (FIG. 3). These are rotated at constant speed by a motor (not shown), and tachometer 14 forms part of a control loop to regulate the motor output speed, such as more fully explained in U.S. Pat. No. 3,814,844 of June 4, 1974.

The end of shaft 15 forms a spindle 20 for the recorder drive, and a disc driver hub 23 is attached to the drive shaft 15 between the spindle end 20 and flywheel 12. Driver 23 carries a disc driver pin 25 which forms a projection extending outwardly from the upper surface 26 of driver 23. Pin 25 is received in a small bore 28 in driver 23 and is biased outwardly through surface 26 by a spring 29. Spring 29 is retained within an enlarged extension 31 of bore 28 by a set screw 32. Pin 25 is held in the small bore portion 28 against spring 29 by a pin boss 33 which is biased by spring 29 against the shoulder 34 between the large bore portion 31 and the small bore portion 28. Spring 29 thus allows pin 25 to be depressed into the driver 23 and restores the pin projection to its extended or free position outward of the driver upper surface 26.

Figure 2:
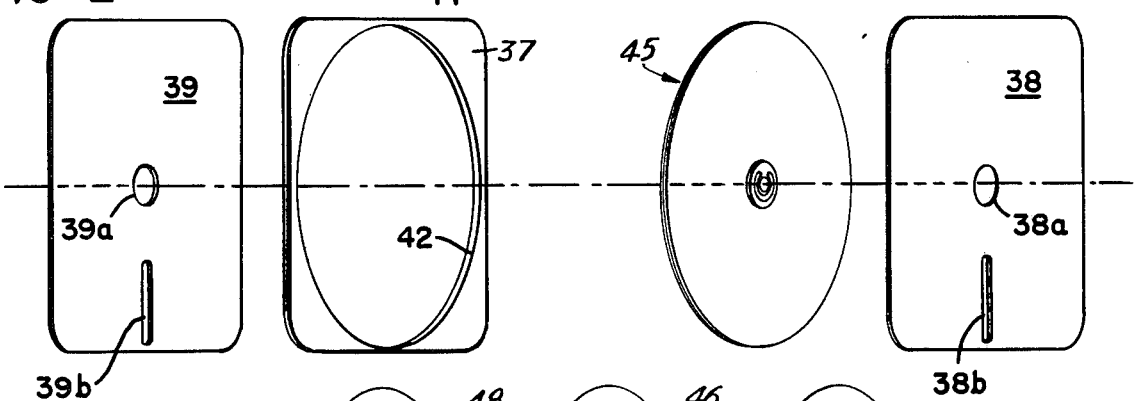
FIG. 2 is an exploded perspective view of a cassette embodying the present invention.

A cassette 35 (FIG. 2) is received within a cassette carriage 36 (FIG. 1) for positioning the cassette over the disc driver 23. The cassette 35 is built up of a central frame or spacer 37 and thin but relatively rigid top and bottom covers of walls 38 and 39 which are suitably attached to the spacer 37, as by a surrounding trim piece 40 and suitable adhesive. The circular opening 42 receives and contains the recording disc assembly 45, which is shown in component form in FIG. 3. The frame also holds the locator rings 37a, whose function is more fully described in said U.S. Pat. No. 3,845,502.

The disc assembly comprises a flexible center backing disc 46, made of two pieces of a synthetic cloth secured back to back. The cloth is preferably a synthetic fiber fabric having short synthetic fibers (such as nylon and/or rayon) secured endwise thereto, each cloth to be in the order of 0.030 inches thick, and the outer surfaces presented by the fiber ends being a slightly compliant backing surface. On both sides of the backing disc are thin flexible recording discs 48. These are preferably Mylar polyester base discs with a coating of chromium dioxide as the magnetic material. Each of these discs has a thickness in the order of 0.001 inches.

The discs together have a thickness only in the order of 0.032 inches, and they do not have sufficient rigidity to sustain themselves flat, rather they are supported within the cassette, surrounded on their edges by frame 37, and covered and supported (when not rotating) by the top and bottom walls 38 and 39.

Figure 5:
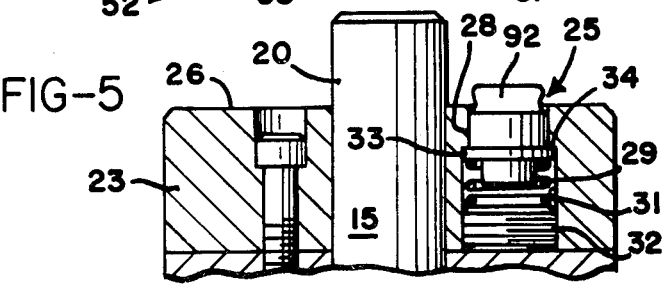
FIG. 5 is an enlarged cross-sectional view of the driver hub.

The discs are held together only at their centers, by a driven hub 50 which includes lower and upper hub portions 51 and 52 between which the discs are clamped. Hub portions 51 and 52 are fastened by screws 53 (FIG. 5), and optional spacer washers 54 may be included between the centers of the discs as shown in FIG. 3.

Lower hub portion 51 includes a spindle opening or aperture 55 passing through the center thereof and normal to the plane of the discs. The upper hub portion 52 receives this center of hub part 51 so that when the hub portions are joined, the opening 55 is a receiver for the spindle 20. In the preferred embodiment, aperture 55 is surrounded by internally tapered bosses 58 as shown in FIG. 4, which function to guide hub 50 (FIG. 4) onto the spindle 20 to define an axis of rotation for the hub 50 and the disc assembly.

Figure 4:
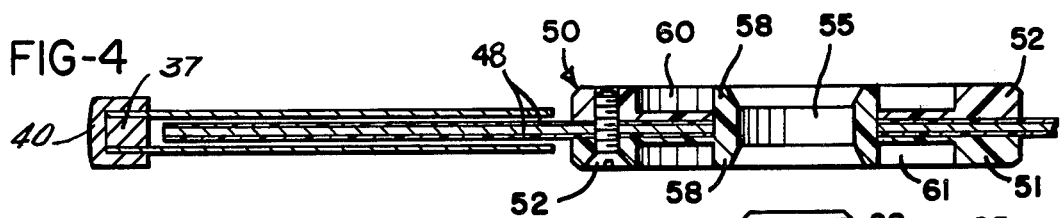
FIG. 4 is an enlarged partial cross-sectional view of the assembled elements shown in FIGS. 2 and 3.

The top and bottom walls 38 and 39 are provided with central circular openings 38a and 39a which are somewhat larger in diameter than the driven hub 50, as can be seen particularly in FIG. 4. Likewise, the diameter of the assembled discs is somewhat less than the diameter of the circular opening 42, thus the disc and driven hub assembly is somewhat loosely confined within the cassette structure. This allows the driven hub to move as necessary in order to achieve proper alignment with the drive hub 25, as is explained hereafter in greater detail.

As mentioned previously, the assembled discs are not sufficiently stiff to sustain themselves in a plane, but when the driven hub is rotated at top speed centrifugal force on the disc assembly is sufficient to stiffen them into a plane of rotation which is perpendicular to the axis of rotation defined by the drive and driven hub cooperation, as explained below. During such rotation, the cassette structure is supported in the carriage 36 and the rotating discs spin within the interior of the cassette, free from contact with the interior of the cassette, specifically out of contact with the inside of the top and bottom walls 38 and 39. In one specific embodiment of a recorder using this invention, the speed of rotation of the discs is 3,600 r.p.m., or 60 rev./sec. This is related to the field rate of N.T.S.C. standard video signals, wherein there are thirty frames, and therefore sixty fields, in the well known interlaced scan system, in every second of time. At speeds of this order, air enters the gap between the openings 38a, 39a and the discs, and is caused to flow over the recording surfaces of the disc, generally like the action of a centrifugal pumping device. This flow of air exits through the slots 38b and 39b, which are aligned transversely of the cassette, as will be apparent from FIG. 2. Even if a simpler embodiment is used with only one magnetic recording system, both transversely aligned slots are provided. It has been found that this alignment of the slits enables the flow of air to exit approximately uniformly on both sides of the spinning discs, thus, there is no effective change in air pressure in the region where the discs pass the slots. These slots, of course, also provide access for the magnetic transducer which must interface with the recording surface, and in a typical recorder means will be provided to move the transducer, for example with a stepping motion along the radius of the recording disc. In the single field or sequential field recorder, such as mentioned above, each circular track on the disc surface followed by the transducer will record one field of video information.

It has been discovered that if the slots 38b, 39b are not aligned on opposite sides of the cassette, the exit of air through one slot only will result in a reduced pressure in the region of the slot, and in spite of the centrifugal force on the spinning disc, the surface of the recording disc passing over the slot will tend to diverge from its plane of rotation outwardly into the slot, interferring with proper interfacing of the transducer and the recording surface. With slots on both sides, i.e., in the top and bottom walls of the cassette, any difference in air pressure due to the escape of air is equalized on the opposite side of the disc assembly and it has been found that the recording disc surface maintains itself essentially in its plane of rotation.

Upper hub 52 has a recess 60 formed and elongated therein in a generally circumferential manner, and lower hub 51 has a substantially identical recess 61 formed and elongated therein in a generally circumferential manner about the spindle opening. Recesses 60 and 61 are located at about the same distances from the centers of the hub spindle opening 55 as the disc driver pin 25 is from the center of spindle 20. Thus, when the driven hub 50 is placed on the disc driver 23, with spindle 20 engaged within spindle opening 55, one of recesses 60 or 61 will be positioned for receiving the disc driver pin projection 25 therewithin.

As shown in FIGS. 7 and 8, recesses 60 and 61 do not completely surround the spindle openings 55, and when driven hub 50 is placed over spindle 20 it is possible that one of the solid portions 63 or 64 between the ends of recesses 60 or 61 might rest upon the disc driver pin 25. In that case, pin 26 will retract into driver 23 against spring 29. Subsequent rotation of the driver and driver pin beneath the driven hub then moves pin 25 from beneath the solid portion 63 or 64, allowing spring 29 to restore pin 25 to its extended position, projecting into the opposing recess.

The arrows in FIGS. 6-8 illustrate the direction of rotation for the preferred embodiment, and the drive for rotating the discs 48 is coupled from the drive motor to the discs by means of the disc driver pin 25 and driven hub 50. More particularly, when the motor drive shaft 15 is rotated by the drive motor, the driver 23 is rotated thereon so that the driver pin 25 moves through the recess 60 or 61 which has been placed over it. Pin 25 is brought into driving engagement with the corresponding recess end wall 70 or 71 in the recesses 60 and 61. The surface of the disc driver 23 thus serves as a driving surface, and the walls 70 and 71 serve as driven surfaces, a single such driven surface being provided in each recess 60 or 61. Accordingly, the drive for the magnetic recording discs is provided by a single pair of surfaces for each hub recess, namely, the driving surface on the disc driver pin 25 and the corresponding driven surface 70 or 71, whichever is presented to the driver). Only one pair of surfaces is engageable at a time, and the driven hub 50 will therefore always be in the same position with respect to driver 23 for that pair. Since driver 23 is fixed to the input shaft 15, the angular position of the drive hub 50 and the recording discs, with respect to the angular position of the drive shaft, the drive motor, and so on, will always be the same, regardless of the particular angular position of the discs and driven hub when first inserted into the recorder 10. Further, this angular location is fully automatic.

As shown particularly in FIGS. 7, 8 and 11, the driven surfaces 70 and 71 are not on a line through the center 75 of the spindle opening 55, but on a chord of the disc assembly. Since the axis of rotation 59 for the recorder drive is on the center of the drive shaft 15, the axis of rotation for the hub 50 and discs 40 will be near or on the centers 75 of the spindle openings 55 and 56. Thus, the driven surfaces 70 and 71 define planes which will pass outside the axis of rotation of the hub 50 and discs 40.

As illustrated in FIGS. 11 and 13, pin 25 will engage the driven surface or wall 71 (for example) at an angle which draws the hub 50 laterally (to a slight extent) across the driver upper surface 26 to bring the wall of spindle opening 55 against the spindle 20. Since there is but a single driving surface on the driver pin 25, and since only a single driven surface (70 or 71) is engaged at a time, these define a unique pair so that the hub 56 (and recording discs 48) will always be returned exactly to the same location. Any slack or space 79 resulting from manufacturing tolerances in the spindle opening 55 and diametral clearance between spindle opening 55 and spindle 20 will thus always be taken up in exactly the same direction. The hub 50 and discs 48 may be in a slightly eccentric position, but will always return to exactly that same position. As shown in FIG. 11, the center 75 of spindle opening 55 then does not coincide precisely with the axis of rotation 59 of spindle 20. However, the space is slight and will always be the same, so all tracks recorded on the discs 48 when hub 50 is so positioned will be recorded around the spindle axis of rotation 59. That is, the recorded tracks may be eccentric with regard to the center 75 of spindle opening 55, but they will always be concentric with regard to the actual axis of rotation 59 on which they are rotated in the recorder.

Due to manufacturing tolerances, the amount that the center 75 is one hub 50 is shifted from the axis of rotation 59 will usually vary from that of another hub. These distances will be unique, however, for each hub, so that the tracks recorded thereon will always be concentric with regard to the axis of rotation 59. This results in accurate repeatability and enables close spacing of the recording tracks while permitting adequate manufacturing tolerances in the size and shape of the spindle openings 55.

When cassette 35 is to be played back in another recorder of the same general configuration, the action of pin 25 of the second recorder will shift the disc assembly with its recorded tracks against spindle 20 and will rotate it about axis 59 of the second machine. Any error in the position of the recorded tracks with respect to the axis of rotation 59 of the second machine will amount to the differences in the dimension from the axis 59 to the surface of spindle 20, or one half the difference of the diameters for spindles which are ground after assembly only their bearings. Grinding after assembly makes the diametral center coincident with the rotation center or center of the bearings.

Analytically, the driving engagement between driver pin 25 and the driven surfaces 70 or 71 yields a thrust vector 85 (FIGS. 13 and 14) having a component 87 normal to a radius of one of the discs (FIG. 13) and in the plane thereof (FIG. 14). This component causes the hub and discs to rotate. There is also a component 90 (FIG. 13) which diverges from a vector normal to the radius of one of the recording discs, this vector causing the hub to shift in the plane of the disc and across driver surface 26 until opening 55 abuts spindle 20.

In order to seat the hub 50 firmly upon the driver upper surface 26, the disc driver pin 25 has an outwardly enlarged head 92 (FIG. 12) and the driven surfaces 70 and 71 are formed or undercut with a slope substantially matching the slope of the outwardly enlarged head 92. The driven surfaces 70 and 71 thus define planes which are not perpendicular to the planes of the magnetic recording discs 48 but are instead distinct therefrom. When driver pin head 92 engages one of the driven surfaces 70 or 71, it urges the hub 50 downwardly against the disc driver surface 26. The resulting thrust vector 85 (FIG. 14) between the driving surface on pin 25 and the driven surface 70 or 71 includes a vector component 95 parallel to the hub body axis of rotation 59 and directed toward the disc driver 23, drawing the hub 50 thereagainst.

While the form of apparatus herein described constitutes a preferred embodiment of this invention, it is to be understood that the invention is not limited to this precise form of apparatus, and that changes may be made therein without departing from the scope of the invention.

What is claimed is:

1. In a magnetic recorder of the flexible disc type, an improved recording device comprising a pair of thin flexible recording discs having oppositely facing magnetizable surfaces, a flexible backing disc between said recording discs and extending behind essentially the entire surface of said recording discs, a hub connected to all three of said discs and forming the sole connection therebetween, said hub including a central aperture and a drive aperture outwardly of said central aperture, said drive aperture including surface extending along a chord of said hub and cooperating with said central aperture to define the center of rotation of said discs, a cassette surrounding said discs in protective and supportive relation, said cassette including top and bottom walls spaced apart sufficiently to avoid substantial contact with said recording discs when said hub is rotated at recording speed, said top and bottom walls having openings sufficiently larger than and aligned with said hub to afford drive access to said hub and to allow said hub and discs to comply to a center of rotation established by the structure of said hub, and said top and bottom walls having elongated transducer access ports extending on a radius of said discs and being aligned with each other whereby air flowing outwardly in said cassette during rotation of said discs will tend to exit equally at both the top and bottom of the cassette so as to minimize disturbance of the plane assumed by the rotating discs.

2. In a magnetic recorder of the flexible disc type, an improved recording device comprising a flexible backing disc, a thin flexible recording disc corresponding in size to said backing disc, said recording disc having an outwardly facing magnetizable surface, said discs in combination being incapable of sustaining themselves in a plane unless rotated at substantial speed, a driven hub connected to the centers of said discs and forming the sole connection therebetween, a rotatable drive hub, said hubs including means engagable only at one angular location to rotate said discs and to define the center of rotation of said discs, a cassette having relatively rigid top and bottom walls connected at their edges and surrounding said discs in protective and supportive relation, said to and bottom walls being spaced apart sufficiently to avoid contact with said discs when said hub is rotated at recording speed, at least one of said top and bottom walls having openings larger than and surrounding said hub to afford access to said drive hub and to allow said driven hub and discs to comply to the center of rotation established by the structure of said hubs, and said top and bottom walls having elongated ports extending on a radius of said discs and being aligned with each other whereby air flowing outwardly in said cassette during rotation of said discs will tend to exit equally at both the top and bottom of the cassette so as to minimize disturbance of the plane assumed by the rotating discs passing by said ports.

3. In a magnetic recorder of the flexible disc type, an improved recording device comprising a pair of thin flexible recording discs having oppositely facing magnetizable surfaces, a thin flexible backing disc between said recording discs and extending behind essentially the entire surface of said recording discs, said backing disc having surfaces formed of short closely packed fibers extending normally to the surfaces of said backing disc into compliant supportive relation to the backs of said recording discs, said discs altogether being incapable of sustaining themselves in plane unless rotated at substantial speed, a driven hub connected to all three of said discs and forming the sole connection therebetween, said driven hub including a central aperture and a drive aperture outwardly of said central aperture, said drive aperture including a surface extending along a chord of said hub, a rotatable drive hub including a central pin engagable in said central aperture of said driven hub and a drive pin receivable in said drive aperture to rotate into contact with said surface and to exert a rotational force on said driven hub, a cassette surrounding said discs in protective and supportive relation, said cassette including top and bottom walls spaced apart to avoid contact with said recording discs when said driven hub is rotated at recording speed, and said top and bottom walls having elongated transducer access ports extending on a radius of said discs and being aligned with each other whereby air flowing outwardly in said cassette during rotation of said discs will tend to exit equally at both the top and bottom of the cassette so as to minimize disturbance of the plane assumed by the rotating discs.

* * * * *